3,657,223
PROCESS FOR THE PREPARATION OF BENZO-
DIAZEPIN-2-ONE DERIVATIVES
Joseph Hellerbach and André Szente, Basel, Switzerland,
and Armin Walser, West Caldwell, N.J., assignors to
Hoffmann-La Roche Inc., Nutley, N.J.
No Drawing. Filed Jan. 9, 1970, Ser. No. 1,843
Int. Cl. C07d 53/06
U.S. Cl. 260—239.3    10 Claims

ABSTRACT OF THE DISCLOSURE

Process for the preparation of benzodiazepin-2-ones comprising effecting ring expansion of the novel 2-oxo-3-aminoquinoline intermediates via acid or heat treatment. The end products are useful as sedatives, tranquilizers, anti-convulsants and muscle relaxants.

DESCRIPTION OF THE INVENTION

This invention relates to novel processes for the preparation of benzodiazepines and to novel intermediates therefor. The benzodiazepines to which the invention relates are selected from the group consisting of compounds of the formula

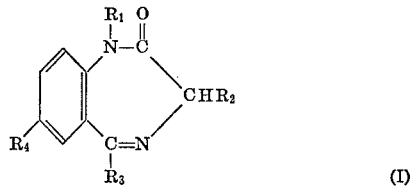

(I)

wherein $R_1$ is hydrogen, lower alkyl or dilower alkyl-amino-lower alkyl; $R_2$ is hydrogen or the group —COO—lower alkyl or —COOA wherein A is the cation of a base; $R_3$ is phenyl, mono-halophenyl or pyridyl; and $R_4$ is hydrogen, halogen or nitro.

As used herein, either alone or in combination, the term "lower alkyl" comprehends straight or branched chain hydrocarbon groups having from 1–7 carbon atoms, preferably 1–4 carbon atoms, such as methyl, ethyl, propyl, and the like. The term "halogen" represents all four forms thereof, i.e., fluorine, chlorine, bromine and iodine, unless expressly indicated otherwise.

When $R_5$ is the cation of a base, said cation can be derived from any suitable base. Representative of suitable bases are alkali metal hydroxides such as sodium hydroxide and the like, alkaline earth metal hydroxides such as triethyl amine and the like, and ammonium hydroxide.

A preferred class of compounds prepared according to the process of the invention are those of the Formula I wherein $R_1$ is hydrogen or lower alkyl, most preferably methyl, $R_2$ is hydrogen, $R_3$ is phenyl, halophenyl, with the halogen atom preferably positioned in the 2-position of the phenyl ring, or pyridyl, preferably attached to the benzodiazepine nucleus at the 2-position thereof, and $R_4$ is halogen, preferably chlorine, or nitro, i.e., compounds of the formula

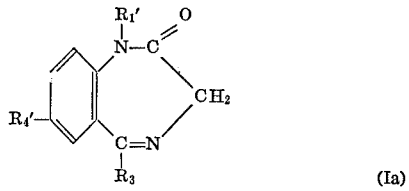

(Ia)

wherein $R_1'$ is hydrogen or lower alkyl, preferably methyl, $R_4'$ is halogen, preferably chlorine, or nitro, and $R_3$ is as described above, most preferentially where selected from the group consisting of phenyl (2'-halophenyl) or 2-pyridyl.

Another preferred class of compounds prepared according to the process of the present invention are those of the Formula I wherein $R_1$ is a diethylaminoethyl group and $R_3$ is a 2-fluorophenyl group, i.e., compounds of the formula

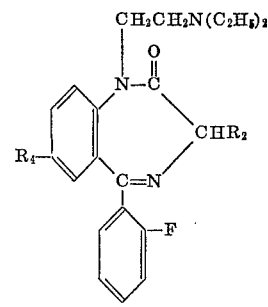

(Ib)

wherein $R_2$ and $R_4$ are as described above.

A particularly preferred aspect of the present invention results in the preparation of 7-chloro-5-phenyl-1-methyl-1,3-dihydro - 2H - 1,4 - benzodiazepin - 2 - one, 7-nitro-5-phenyl - 1,3 - dihydro-2H-1,4-benzodiazepin-2-one, and 7-chloro-1-(diethylaminoethyl)-2H-1,3-dihydro-5-(2-fluorophenyl)-2H-1,4-benzodiazepin-2-one.

One novel process aspect of the present invention involves effecting ring expansion of a compound of the general formula

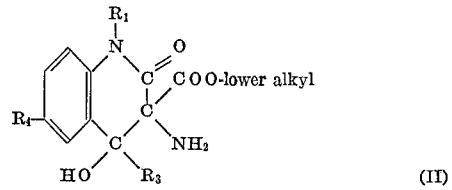

(II)

wherein $R_1$, $R_3$ and $R_4$ are as described above or acid addition salts thereof with a pharmaceutically acceptable acid, via acid or thermal treatment thereof to produce a compound of Formula I above wherein $R_2$ is —COO-lower alkyl (i.e., carbalkoxy); that is a compound of the formula

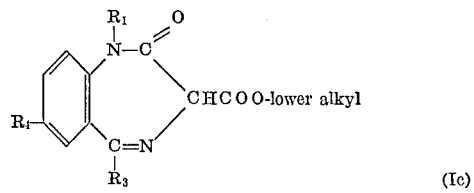

(Ic)

wherein $R_1$, $R_3$ and $R_4$ are as described above. If desired, the carbalkoxy group appearing in the 3-position of the compounds of Formula Ic above can be saponified to the corresponding compound of Formula I above wherein $R_2$ is —COOA where A is as above. The so-obtained compounds of Formula I wherein $R_2$ is a —COO-lower alkyl grouping or a —COOA grouping where A is as above can be converted into the corresponding compound of Formula I wherein $R_2$ is hydrogen by decarboxylation.

When a compound of Formula II above is treated with acid to prepare the corresponding compound of Formula I wherein $R_2$ is —COO-lower alkyl, (i.e. the compound of Formula Ic) the reaction is expediently carried out in the presence of an inert organic solvent. Suitable inert organic solvents for the purposes of this aspect of the present invention are hydrocarbons such as benzene, toluene and the like, and chlorinated hydrocarbons such as chloroform, carbon tetrachloride and the like.

Further, when a compound of Formula II above is treated with acid to effect ring expansion thereof to yield the corresponding compound of Formula Ic, temperature and pressure are not critical to the successful performance of this process aspect. Thus, the reaction can be conducted at temperatures from about room temperature to about the reflux temperature of the reaction mixture, but is preferably effected with the application of heat, most preferably at about the reflux temperature of the reaction mixture.

Suitable acids for the purposes of this process aspect of the present invention include organic and inorganic acids, for example, alkane carboxylic acids such as formic acid, acetic acid, propionic acid and the like, aromatic acids such as benzoic acid and hydrohalic acids such as hydrochloric acid, hydrobromic acid, phosphoric acid and the like. The amount of acid is not critical, but a complete protonation of the amine nitrogen in the starting material should be avoided. When using acetic acid, this can also serve as the solvent. The acid can also be employed in the form of an acid addition salt such as pyridine hydrochloride.

In a further process aspect of the present invention, the compounds of Formula II above can be converted into compounds of Formula Ic above by heating said compounds in the absence of an acid. This thermal treatment to effect ring expansion of the Formula II compounds can be accomplished in the presence or absence of an inert organic solvent. When the conversion is accomplished in the presence of an inert organic solvent, the reaction mixture should be heated to temperatures between 40° C. and the reflux temperature of the reaction mixture. When the conversion is accomplished by merely heating the compounds of Formula II in the absence of an inert organic solvent, the compounds should be heated to temperatures between about 100 and 200° C.

Suitable inert organic solvents for the purposes of this aspect of the present invention include hydrocarbons such as benzene, toluene and the like and chlorinated hydrocarbons such as chloroform, carbon tetrachloride and the like.

The compounds of Formula Ic above are known and can be saponified using conventional techniques to obtain the corresponding compounds of Formula I above wherein $R_2$ is —COOA and A is as above. For example, the saponification of a Formula Ic compound can be effected by treating said compounds with a base, such as an alkali hydroxide, e.g. sodium hydroxide, potassium hydroxide and the like, an alkaline earth hydroxide, e.g. calcium hydroxide and the like, a tertiary organic base such as triethylamine and the like, or ethanolamine. The saponification of a Formula Ic compound can also be effected by treating said compound with an acid. When an acid is used as the saponification agent, saponification and decarboxylation may occur simultaneously so as to produce a compound of Formula I above wherein $R_2$ is hydrogen.

If desired, the compounds of Formula I above wherein $R_2$ is —COO-lower alkyl or —COOA and A is as above can also be decarboxylated using conventional techniques to produce the corresponding compounds of Formula I wherein $R_2$ is hydrogen. The decarboxylation of a Formula I compound wherein $R_2$ is —COOA and A is as above can be accomplished simply by allowing a solution of said compound to stand, or by heating or acidifying the compound in solution. This decarboxylation of the saponified compound occurs slowly upon standing, more quickly on heating and spontaneously upon acidification. The decarboxylation of the Formula I compounds wherein $R_2$ is —COO-lower alkyl is accomplished by first saponifying said compound, i.e. by either acid or base treatment, and then decarboxylating the saponified product as described above.

If the ring enlargement of a compound of Formula II above to produce the corresponding compound of Formula I above is effected via acid treatment and if the acid employed is in an aqueous solution, then the saponification and decarboxylation of the carbalkoxy group at $R_2$ occur in situ during the reaction and one can proceed directly to compounds of Formula I wherein $R_2$ is hydrogen.

The compounds of Formula II above are novel and as such form a part of the invention. These compounds can be prepared following a variety of procedures. In one such procedure, the compounds of Formula II can be prepared by reacting a benzophenone of the general formula

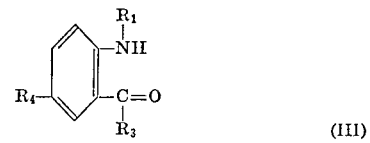

wherein $R_1$, $R_3$ and $R_4$ are as described above with a compound of the general formula

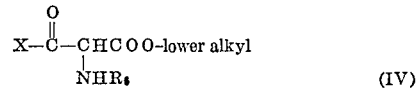

wherein $R_6$ is any suitable leaving group; preferably a carbobenzoxy or tertiary butoxy carbonyl group, and X is halogen.

The reaction between compounds of Formulae III and IV above results in a compound of the general formula

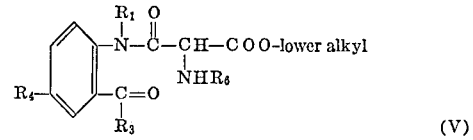

wherein $R_1$, $R_3$, $R_4$ and $R_6$ are as described above.

The compounds of Formula V above can then be converted into the desired compounds of Formula II by effecting ring closure of said compounds. This ring closure of the compounds of Formula V above can be accomplished in several ways. For example treating the compounds of Formula V above with a hydrohalic acid, such as hydrobromic acid, or with glacial acetic acid yields the desired compounds of Formula II directly.

Alternately, the ring closure of the compounds of Formula V above can be accomplished by treating said compounds with a base, thereby obtaining compounds of the general formula

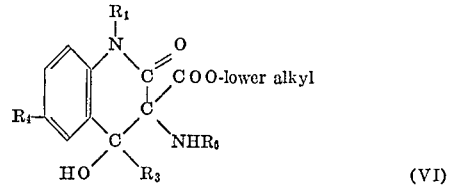

wherein $R_1$, $R_3$, $R_4$ and $R_6$ are as described above and then treating the compounds of Formula VI so obtained with a hydrohalic acid, such as hydrobromic acid, to obtain the desired compounds of Formula II. Suitable bases for this process aspect of the present invention are organic bases such as alcoholates, i.e. sodium methoxide and the like, triethylamine and pyridine, and inorganic bases such as potassium carbonate and the like.

In a further process aspect of the present invention, the compounds of Formula II above can also be prepared by reacting a benzophenone of Formula III above wherein $R_4$ signifies hydrogen or halogen, i.e. a compound of the formula

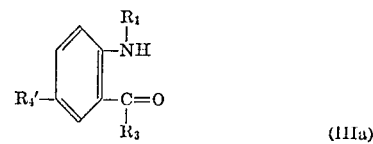

wherein $R_4'$ is hydrogen or halogen and $R_1$ and $R_3$ are as described above with a malonic acid ester halide of the general formula

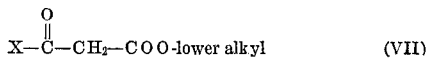

(VII)

wherein X is halogen whereby to obtain a compound of the general formula

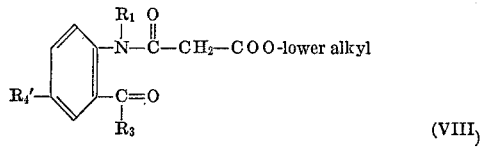

(VIII)

wherein $R_1$, $R_3$ and $R_4'$ are as described above.

The reaction of a benzophenone of Formula IIIa above with a malonic acid ester halide of Formula VII above is expediently effected in the presence of an inert organic solvent. Suitable solvents for this purpose include hydrocarbons such as benzene, toluene and the like, chlorinated hydrocarbons such as methylene chloride and the like, and ethers such as dioxane and the like. The reaction may be effected at temperatures between —40° C. and the reflux temperature of the reaction mixture.

Furthermore, the reaction between compounds of Formulae IIIa and VII above may be effected in the presence or absence of an acid acceptor. If an acid acceptor is utilized, suitable acid acceptors for this purpose are, for example, bicarbonates such as sodium bicarbonate and the like, and triethylamine.

The compounds of Formula VIII obtained as described above may then be nitrated or nitrosated to produce compounds of the general formula

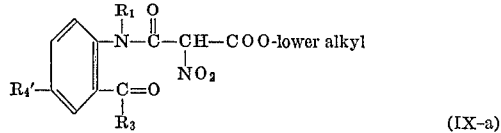

(IX-a)

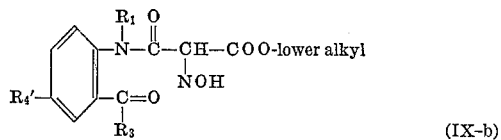

(IX-b)

wherein $R_1$, $R_3$ and $R_4'$ are as described above.

The nitration or nitrosation of the compounds of Formula VIII above to produce the corresponding compounds of Formula IXa or IXb above is expediently carried out with nitric acid or nitrous acid, for example, provided by the addition of sodium nitrite to glacial acetic acid in accordance with the conventional procedures. The reaction is preferably effected at room temperature, although temperatures above and below room temperature can also be employed. The nitration or nitrosation reaction is preferably effected in the presence of a solvent. Suitable solvents for this purpose include hydrocarbons or chlorinated hydrocarbons such as methylene chloride and the like.

The resulting compounds of Formula IXa or IXb prepared as described above may then be reduced to yield the desired compounds of Formula II above. The reduction of compounds of Formula IXa or IXb can be effected by conventional means as, for example, by treating said compounds with zinc in glacial acetic acid or zinc in ammonium chloride. Here again the reaction is preferably effected in the presence of an inert organic solvent such as a hydrocarbon, e.g. benzene, toluene and the like, a chlorinated hydrocarbon, e.g. methylene chloride and the like, an ether, e.g. dioxane, or an alcohol, e.g. methanol, ethanol and the like. The reaction is preferably effected at temperatures between 0° C. and reflux temperature of the reaction mixture. It is assumed that this reduction reaction proceeds via the formation of a hydroxylamine intermediate product.

The compounds of Formula II, prepared by any of the procedures discussed above, may, in part, be present in the form of the corresponding open compounds, i.e. compounds of the general formula

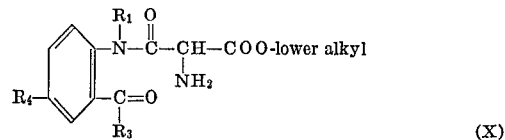

(X)

wherein $R_1$, $R_3$ and $R_4$ are as described above. The compounds of Formula II or X above may be converted directly into the corresponding compounds of Formula I, if desired, without isolating said compounds from the reaction mixture in which they are prepared.

The following examples are illustrative of the process of the present invention.

EXAMPLE 1

A suspension of 16 g. of 2-carbomethoxy-N-(benzyloxycarbonyl)glycine in 100 ml. of dry methylene chloride, cooled to —20°, is treated with 12.6 g. of phosphorus pentachloride. After the mixture has been stirred at —20° to —10° for 30 minutes, 9.8 g. of 5-chloro-2-methylaminobenzophenone are added to the now clear solution.

200 ml. of 10% aqueous soda solution are thereupon added dropwise at 0–5° with strong stirring during 15 minutes. After the addition, the mixture is further stirred at 10–15° for 15 minutes.

The methylene chlorine phase is separated off, washed with saturated sodium bicarbonate solution, dried over anhydrous sodium sulphate and evaporated. There is obtained a slightly yellow-coloured resin (23.8 g.) of crude 2′ - benzoyl - 2-[(benzyloxycarbonyl)amino]-2-carbomethoxy-4′-chloro-N-methyl-acetanilide. A solution of 7.5 g. of this resin in 40 ml. of absolute methanol is treated with 0.2 ml. of triethylamine and allowed to stand at room temperature for 18 hours. The product crystallized out is filtered off by suction, washed with methanol and dried in vacuum. 3-[(benzyloxycarbonyl)amino]-3-carbomethoxy-6 - chloro-4-hydroxy-1-methyl-2-oxo-4-phenyl-1,2,3,4-tetrahydroquinoline, melting point 177–180° C., is obtained after recrystallization from methylene chloride/hexane.

10 g. of 3 - [(benzyloxycarbonyl) - amino]-3-carbomethoxy - 6 - chloro - 4 - hydroxy - 1 - methyl-2-oxo-4-phenyl - 1,2,3,4 - tetrahydro-quinoline are dissolved in a mixture of 50 ml. of methylene chloride and 50 ml. of glacial acetic and treated with 40 ml. of hydrogen bromide in glacial acetic acid (ca 30%). After standing overnight at room temperature, the mixture is concentrated in vacuum, the hydrobromide of 3 - amino - 3 - carbomethoxy - 6 - chloro - 4 - hydroxy - 1 - methyl - 2 - oxo-4-phenyl - 1,2,3,4 - tetrahydro-quinoline being obtained in crystalline form. This is suspended in absolute ether, filtered off by suction, washed with absolute ether and dried, yielding the product, M.P. 143–147° (dec.).

For the preparation of the base, the hydrobromide is partitioned between methylene chloride and aqueous soda solution. The dried organic phase is evaporated and the residue crystallized from ether, yielding 3-amino-3-carbomethoxy - 6 - chloro - 4 - hydroxy - 1 - methyl - 2-oxo-4 - phenyl - 1,2,3,4 - tetrahydro-quinoline, melting point 125–128° C.

In analogous manner, starting from 2 - carbethoxy-N-(benzyloxy-carbonyl) glycine there can be manufactured 3 - amino - 3 - carbethoxy-6-chloro-4-hydroxy-1-methyl-2 - oxo - 4 - phenyl - 1,2,3,4-tetrahydro-quinoline of melting point 150–152° C.

EXAMPLE 2

0.5 g. of 3 - amino - 3 - carbomethoxy-6-chloro-4-hydroxy - 1 - methyl - 2 - oxo - 4 - phenyl - 1,2,3,4-tetrahydroquinoline are boiled under reflux for 3 hours in 20 ml. of absolute benzene in the presence of 2 ml. of glacial acetic. After evaporation in vacuum, the crystalline residue is recrystallized from methylene chloride-methanol. 0.43 g. of methyl 7 - chloro - 2,3 - dihydro - 1 - methyl - 2- oxo - 5 - phenyl - 1H - 1,4-benzodiazepine-3-carboxylate of M.P. 224–226° are obtained.

In analogous manner, from 3 - amino - 3 - carbethoxy-6 - chloro - 4 - hydroxy - 1 - methyl - 2 - oxo-4-phenyl-1,2,3,4 - tetrahydroquinoline there is obtained ethyl 7-chloro - 2,3 - dihydro - 1 - methyl - 2 - oxo-5-phenyl-1H - 1,4 - benzodiazepine - 3 - carboxylate.

EXAMPLE 3

361 mg. of 3 - amino - 3 - carbomethoxy - 6 - chloro - 4 - hydroxy - 1 - methyl - 2 - oxo - 4 - phenyl-1,2,3,4-tetrahydroquinoline are boiled under reflux for 20 hours in 10 ml. of 80 percent acetic acid. The residue obtained after evaporation in vacuum is partitioned between 2-N hydrochloric acid and ether. The ether phase is once more extracted with 2-N hydrochloric acid. After washing with ether, the aqueous solution is made alkaline with ammonia and extracted three times with methylene chloride. The methylene chloride extracts, dried over sodium sulphate, are evaporated. After seeding, 7-chloro-1,3-dihydro - 1 - methyl - 5 - phenyl - 2H - 1,4- - benzodiazepin-2-one, melting point 127–129° C., crystallizes from the residue.

EXAMPLE 4

12.6 g. of phosphorus pentachloride are added to a suspension of 16 g. of 2-carbomethoxy-N-(benzyloxycarbonyl)glycine in 100 ml. of methylene chloride, cooled to —20°. After the mixture has been stirred at —20° to —10° for 30 minutes, 9.3 g. of 2 - amino - 5 - chlorobenzophenone are introduced. 100 ml. of 10 percent soda solution are allowed to run in with vigorous stirring and the mixture is further stirred at 5–10° for 30 minutes. The methylene chloride phase is separated off, washed with bicarbonate solution, dried over sodium sulphate and evaporated. Crystallization of the residue from methanol yields 17.5 g. of 2'-benzoyl-2-carbomethoxy-2-[(benzyloxycarbonyl)amino]-4'-chloro-acetanilide which melts at 110–112° after recrystallization from methanol.

20 ml. of a 30 percent solution of hydrogen bromide in glacial acetic are added to a solution of 5 g. of 2'-benzoyl - 2 - [(benzoyloxycarbonyl)amino] - 2 - carbomethoxy - 4' - chloro-acetanilide in 30 ml. of glacial acetic acid. After standing at room temperature for 16 hours, the mixture is evaporated in vacuum and the residue partitioned between water and ether. The aqueous phase is washed with ether and made alkaline with 10% soda solution. The base which separates out is extracted with methylene chloride. The methylene chloride extracts, dried over sodium sulphate, yield, after evaporation in vacuum, 3.5 g. of residue from which 2.7 g. of 3-amino-3-carbomethoxy - 6 - chloro - 4 - hydroxy - 2 - oxo - 4 - phenyl-1,2,3,4 - tetrahydroquinoline, M.P. 162–167° C., are obtained by crystallization from ether. The product melts at 168–170° C. after recrystallization from methylene chloride-methanol-ether.

EXAMPLE 5

1 g. of 3 - amino - 3 - carbomethoxy - 6 - chloro-4-hydroxy - 2 - oxo - 4 - phenyl - 1,2,3,4-tetrahydroquinoline is boiled under reflux for 4 hours in 20 ml. of benzene in the presence of 2 ml. of glacial acetic. After evaporation in vacuum, the residue is crystallized from methylene chloride-methanol, yielding methyl - 7 - chloro - 2,3 - dihydro - 2 - oxo - 5 - phenyl - 1H - 1,4-benzodiazepine-3-carboxylate, M.P. 217–219° C.

EXAMPLE 6

47 g. of phosphorus pentachloride are added to a suspension of 74 g. of 2 - carbethoxy - 4 - (benzyloxycarbonyl) glycine in 400 ml. of methylene chloride, cooled to —20° C. The mixture is stirred at —20° C. for 2 hours, and thereupon 58 g. of 2 - amino - 5 - nitrobenzophenone, 2 ml. of dimethylformamide in 150 ml. of methylene chloride are introduced. The methylene chloride is evaporated off with vigorous stirring (~70° C.). The residue is extracted with methylene chloride-10% soda solution, the methylene chloride phase dried over magnesium sulphate and evaporated. The yellow-colored resin is stirred in 200 ml. of hydrogen bromide-acetic acid (30%) for 2 hours at room temperature and concentrated in vacuum. An analytical sample is crystallized from ethanol-ether, the hydrobromide of 3 - amino - 3 - carbethoxy - 6 - nitro - 4 - hydroxy - 2 - oxo - 4 - phenyl - 1,2,3,4-tetrahydroquinoline, melting point 188° (dec.), being obtained. For the preparation of the base, the crude mixture is partitioned between ether and water and extracted three times with ether. The water phase is made alkaline with 10 percent soda solution and extracted with methylene chloride. The dried organic phase is evaporated and the residue directly further processed.

EXAMPLE 7

50 g. of 3 - amino - 3 - carboethoxy - 6 - nitro - 4-hydroxy - 2 - oxo - 4 - phenyl - 1,2,3,4 - tetrahydroquinoline (crude) are stirred in a mixture of 400 ml. of abs. toluene and 160 ml. of glacial acetic at 60° C. for 4 hours. The product crystallizes out, is filtered and washed with toluene, ethyl 2,3 - dihydro - 7 - nitro - 2 - oxo-5-phenyl - 1H - 1,4 - benzodiazepine - 3 - carboxylate of melting point 245° (dec.) being obtained. Further product can be crystallized from the mother liquors by evaporation in vacuum and crystallization from ethanol.

250 mg. of ethyl - 2,3 - dihydro - 7 - nitro - 2 - oxo-5 - phenyl - 1H - 1,4 - benzodiazepine - 3 - carboxylate are dissolved in 3 ml. of ethanol and treated with 1 ml. of 2 N soda lye. The solution is heated for 2 minutes to 80°, then buffered with glacial acetic acid and concentrated. The residue is distributed between 2 N HCl and ether, the water phase is twice washed with ether, neutralized with sodium carbonate and extracted with methylene chloride. The methylene chloride phase is dried over magnesium sulfate, filtered and concentrated. After crystallization of the residue from ether, there is obtained the 7 - nitro - 1,3 - dihydro - 5 - phenyl-2H-1,4-benzodiazepin-2-one, M.P. 222° C.

EXAMPLE 8

A solution of 23 g. of 2-amino-5-chlorobenzophenone in 200 ml. of methylene chloride is overlaid with 100 ml. of saturated sodium bicarbonate solution. 19.3 g. of 2-carbethoxyacetyl chloride are added dropwise with vigorous stirring at 0–5°. After the addition is completed, the mixture is stirred for an additional 10 minutes. The methylene chloride phase is separated off, washed with bicarbonate solution, dried over sodium sulphate and evaporated. The residue is crystallized from ether-hexane by cooling to —10°. After filtering off by suction and drying in vacuum, there is obtained colourless ethyl 2'-benzoyl-4'-chloromalonanilate, M.P. 54–55°.

EXAMPLE 9

A solution of 34.6 g. of ethyl 2'-benzoyl-4'-chloromalonanilate in 250 ml. of glacial acetic acid is treated at 20° with 30 ml. of fuming nitric acid (98%). After 2½ hours standing at room temperature, the reaction mixture is poured onto 1 liter of water. The precipitated resin is separated off from the water phase, washed with water and taken up in ether. The ethereal solution is repeatedly extracted with saturated bicarbonate solution. The extracts, washed out with ether, are acidified with hydrochloric acid and the nitro compound which separates out is extracted with methylene chloride. The extracts, dried over sodium sulphate, yield, after evaporation, a yellow resin of ethyl 2'-benzoyl-4'-chloro-2-nitromalonanilate which is directly further reacted.

A solution of 2 g. of crude ethyl 2'-benzoyl-4'-chloro-2-nitro malonanilate in 50 ml. of methylene chloride is successively treated with 2 ml. of glacial acetic acid and 2 g. of zinc dust.

After the strongly exothermic reaction (reflux of the solvent), the mixture is stirred for an additional 10 minutes. After filtration, the filtrate is evaporated and the residue taken up in 70 ml. of benzene, treated with 2 ml. of glacial acetic acid and boiled under reflux for 2 hours.

The reaction mixture is washed out with saturated sodium bicarbonate solution, dried over sodium sulphate and evaporated. Crystallization of the residue from alcohol yields ethyl 7-chloro-1,3-dihydro-5-phenyl-2H-1,4-benzodiazepin-2-one 3-carboxylate, M.P. 228–230° Further ethyl 7 - chloro-1,3-dihydro-5-phenyl-2H-1,4-benzodiazepin-2-one-3-carboxylate can be obtained from the mother liquor.

EXAMPLE 10

A solution of 50 g. of sodium nitrite is added dropwise to a solution of 34.6 g. of ethyl 2'-benzoyl-4'-chloro-malonanilate in 250 ml. of glacial acetic acid. After 1½ hours stirring at room temperature, the oxime crystallizes out and is filtered off by suction, washed with water and dried in vacuum. Ethyl 2'-benzoyl-4'-chloro-mesoxalanilate 2-oxime, M.P. 98–105° is obtained.

Water is added dropwise to the filtrate with stirring, whereby further oxime crystallizes out.

According to thin layer chromatogram, the crude product consists of a mixture of the two stereoisomeric oximes. These may be separated by chromatography on Kieselgel with 20% acetic ester in methylene chloride. The first eluted isomer melts at 115–117° after crystallization from alcohol-water. The oxime eluted later shows a M.P. of 131–132° after crystallization from ether-hexane.

A solution of 2 g. of ethyl 2'-benzoyl-4'-chloro-mesoxalanilate 2-oxime in 40 ml. of methylene chloride is treated with 2 g. of zinc dust. 4 ml. of glacial acetic acid are added dropwise within 5 minutes with stirring. After the addition, the mixture is stirred at room temperature for 1 hour. The reaction mixture is filtered and the filtrate evaporated. The residue is boiled under reflux for 2 hours in 20 ml. of benzene and 2 ml. of glacial acetic acid. The reaction mixture is washed out with 10% soda solution, dried over sodium sulphate and evaporated. Crystallization of the residue from alcohol yields ethyl 7-chloro-1,3-dihydro-5-phenyl-2H-1,4-benzodiazepin - 2 - one - 3 - carboxylate, M.P. 232–234°. Further material crystallizes from the mother liquor.

EXAMPLE 11

39.2 g. of 2-carbethoxy-acetyl chloride are added dropwise at 0° to a solution of 49.2 g. of 5-chloro-2-methyl-aminobenzophenone in 400 ml. of methylene chloride. After 30 minutes, 400 ml. of saturated bicarbonate solution are added with vigorous stirring within 15 minutes at 0–5° C. The organic phase is separated off, washed with bicarbonate solution and water, dried over sodium sulphate and evaporated in vacuum. The residue crystallizes from ether-hexane. Colourless crystals of ethyl 2'-benzoyl-4'-chloro-N-methyl-malonanilate, M.P. 98–100° are obtained.

EXAMPLE 12

A solution of 36 g. of ethyl 2'-benzoyl-4'-chloro-N-methylmalonanilate in 250 ml. of glacial acetic acid is treated with 30 ml. of fuming nitric acid (98%). After 2 hours standing at room temperature, the reaction mixture is poured onto 1 liter of water. The resin which separates out is separated off, washed with water and taken up in benzene. The benzene solution is washed with water, dried over sodium sulphate and evaporated. The resinous residue of ethyl 2'-benzoyl-4'-chloro-2-nitro-N-methyl-malonanilate is directly further reacted.

2 g. of zinc dust are introduced with stirring into a solution of 2 g. of ethyl 2'-benzoyl 4'-chloro-2-nitro-N-methyl-malonanilate and 2 ml. of glacial acetic acid in 50 ml. of methylene chloride. After the exothermic reaction, the mixture is stirred for 10 minutes, filtered and evaporated. The residue is taken up in benzene and the solution extracted 3 times with 2-N hydrochloric acid. The extracts, back-washed with ether, are made alkaline with 10% soda solution and the bases which separate out extracted with methylene chloride. The extracts are dried over sodium sulphate and evaporated. The residue is dissolved in 20 ml. of benzene. After addition of 2 ml. of glacial acetic acid, the solution is boiled under reflux for 2 hours. The cooled solution is washed out with soda solution, dried over sodium sulphate and evaporated. Crystallization of the residue obtained from alcohol yields ethyl 7-chloro-1,3-dihydro-1-methyl-5-phenyl - 2H - 1,4 - benzodiazepin-2-one-3-carboxylate, M.P. 196–199°.

EXAMPLE 13

A solution of 18 g. of ethyl 2'-benzoyl-4'-chloro-N-methyl malonanilate in 125 ml. of glacial acetic acid is treated with a solution of 25 g. of sodium nitrite in 50 ml. of water. 10 ml. of conc. sulphuric acid are added dropwise to the stirred reaction mixture. After the mixture has been stirred at room temperature for 2 hours, the product is crystallized out by addition of water, filtered off by suction and dried in vacuum. Ethyl 2'-benzoyl-4'-chloro-N-methyl-mesoxalanilate 2-oxime, M.P. 196–198° is obtained. Pure oxime recrystallized from benzene-acetic ester melts at 203–205°.

2 g. of zinc dust are added to a solution of 2 g. of ethyl 2'-benzoyl-4'-chloro - N - methyl-mesoxalanilate 2-oxime in 40 ml. of methylene chloride. 4 ml. of glacial acetic acid are added dropwise during 5 minutes with stirring. After the addition, the mixture is further stirred at room temperature for 30 minutes. The reaction mixture is filtered and evaporated. The residue is boiled under reflux for 2 hours in 20 ml. of benzene and 2 ml. of glacial acetic acid. The benzene solution is thereupon washed with 10% soda solution, dried over sodium sulphate and evaporated. Crystallizaton of the residue from alcohol-ether yields ethyl 7-chloro-1,3-dihydro-1-methyl-5-phenyl - 2H - 1,4-benzodiazepin-2-one-3-carboxylate, M.P. 195–197°.

EXAMPLE 14

12.5 g. phosphorous pentachloride were added to a solution of 17 g. 2-carbethoxy-N-(benzyloxycarbonyl)-glycine in 150 ml. methylene chloride cooled to −20°. The mixture was stirred at −20° until a clear solution resulted. A solution of 12.5 g. of 2-amino-5-chloro-2'-fluoro-benzophenone in 100 ml. methylene chloride was added followed by dropwise addition of 100 ml. aqueous sodium carbonate (10%) with vigorous stirring. Stirring was continued for 2½ hours while the temperature was allowed to rise to 20°. The pH of the aqueous phase was kept at 7–8 by the addition of sodium carbonate. After dilution with water and methylene chloride, the organic layer was separated, washed with water, dried over magnesium sulfate and evaporated. The residue was crystallized from ethanol ether and recrystallized from ethanol to yield ethyl 2-[1-(benzyloxy)formamido] - 2' - (o-fluoro-benzoyl) - 4'-chloro-malonanilate with M.P. 106–107°.

EXAMPLE 15

5 g. ethyl-2-[1-(benzyloxy)formamido] - 2' - (o-fluorobenzoyl)-4'-chloro-malonanilate were suspended in 15 ml. acetic acid containing 30% hydrogen bromide. The suspension was stirred at room temperature until solution was complete (1–2 hours). The mixture was poured on 2 N sodium hydroxide and ice and extracted with methylene chloride. The extracts were dried over magnesium sulfate, filtered and evaporated. The residue was dissolved in ethanol and allowed to crystallize in the refrigerator overnight to yield ethyl 3-amino-6-chloro-4-hydroxy-4-(o-fluorophenyl)-2-oxo - 1,2,3,4 - tetrahydroquinoline-3-carboxylate with M.P. 169–170° dec.

EXAMPLE 16

1.6 g. ethyl 3-amino-1,2,3,4-tetrahydro - 4 - hydroxy-6-chloro-2-oxo - 4 - (o-fluorophenyl)-quinoline-3-carboxylate in 40 ml. toluene and 8 ml. acetic acid were stirred at 60° for 2 hours. Toluene and acetic acid were evaporated.

The residue was dissolved in methylene chloride and the solution was washed with 10% aqueous sodium carbonate. The methylene chloride layer was dried over magnesium sulfate, filtered and evaporated. Chromatography of the residue on 40 g. silica gel (0.05–0.2 mm.) using the solvent mixture methylene chloride:ethylacetate 10:1 yielded ethyl 7-chloro-2,3-dihydro-5-(o-fluorophenyl) - 2 - oxo-1H-1,4-benzodiazepine - 3 - carboxylate, M.P. 193–194° (dec.).

EXAMPLE 17

30.8 g. phosphorous pentachloride were added at −20° to a suspension of 42 g. 2-carbomethoxy-N-(benzyloxycarbonyl)glycine in 150 ml. methylene chloride. After the suspended material had dissolved (about ½ hour) a solution of 25 g. 2-amino-2′-fluoro-5-nitro-benzophenone in 150 ml. methylene chloride containing 3 drops of dimethylformamide was added. The reaction mixture was concentrated on the rotary evaporator at 40° to 50°. The residue was distributed between methylene chloride and saturated aqueous sodium bicarbonate solution containing crushed ice. The methylene chloride layer was separated, washed with water, dried over magnesium sulfate and evaporated. The residue was chromatographed on silica gel with methylene chloride. Crystallization from ether-ethanol yielded ethyl-2-[1-(benzyloxy)formamido]-2′-(o-fluorobenzoyl)-4′-nitromalonanilate with M.P. 104°.

EXAMPLE 18

56 g. ethyl-2-[1-(benzyloxy)-formamido]-2′-(o-fluorobenzoyl)-4′-nitromalonanilate were stirred at room temperature for 1 hour in 120 ml. glacial acetic acid containing 30–33% hydrogen bromide. The solvent was evaporated under reduced pressure and the residue was distributed between water and ether. The aqueous phase was made alkaline by addition of sodium bicarbonate solution and extracted with methylene chloride. The extracts were dried over magnesium sulfate and evaporated. The residue was crystallized from ether to yield ethyl 3-amino-4-hydroxy-6-nitro-4-(o-fluorophenyl) - 2 - oxo-1,2,3,4-tetrahydroquinoline-3-carboxylate with M.P. 163° dec.

EXAMPLE 19

22.2 g. ethyl 3 - amino-4-hydroxy-6-nitro-4-(o-fluorophenyl)-2-oxo-1,2,3,4-tetrahydroquinoline - 3 - carboxylate were stirred at room temperature overnight in a mixture of 400 ml. toluene and 100 ml. glacial acetic acid. After heating for 30 minutes at 100°, the solvents were distilled off under reduced pressure and the residue was distributed between methylene chloride and aqueous sodium bicarbonate. The organic layer was dried over magnesium sulfate, filtered and evaporated. The product was purified by chromatography on 500 g. silica gel (0.005–0.1 mm.) with methylene chloride followed by methylene chloride containing 10% ethyl acetate. The obtained ethyl 2,3-dihydro-7-nitro - 5 - (o-fluorophenyl)-2-oxo-1H-1,4-benzodiazepin-3-carboxylate melted at 201° dec.

EXAMPLE 20

2.1 g. phosphorous pentachloride were added at −20° to a suspension of 2.81 g. 2-carbethoxy-N-(benzyloxycarbonyl)-glycine in 20 ml. methylene chloride. The mixture was stirred until solution was complete. 2.5 g. 2-(2-amino-5-bromobenzoyl)-pyridine dissolved in 40 ml. methylene chloride were added followed by 10% aqueous sodium carbonate. After stirring for 2 hours at 0°, the methylene chloride layer was separated, washed with water, dried, filtered and evaporated. The residue was crystallized from ethanol to yield benzyl 6 - bromo-3-(ethoxycarbonyl)-4-hydroxy - 2 - oxo-4-(2-pyridyl)-1,2,3,4-tetrahydroquinoline-3-carbamate with M.P. 204–208°.

EXAMPLE 21

1.5 g. benzyl 6-bromo-3-(ethoxycarbonyl)-4-hydroxy-2-oxo-4-(2-pyridyl)-1,2,3,4-tetrahydroquinoline - 3 - carbamate were stirred for 1 hour at room temperature in 10 ml. glacial acetic acid containing 30–33% hydrogen bromide. The reaction mixture was concentrated under reduced pressure and the residue washed several times with anhydrous ether to leave ethyl 3-amino-6-bromo-4-hydroxy-2-oxo-4-(2 - pyridyl)-1,2,3,4-tetrahydroquinoline-3-carboxylate with M.P. 220° dec.

EXAMPLE 22

2 g. ethyl 3-amino - 6 - bromo-4-hydroxy-2-oxo-4-(2-pyridyl) - 1,2,3,4 - tetrahydroquinoline-3-carboxylate dihydrobromide were dissolved in water. The base was liberated by addition of sodium carbonate and extracted with methylene chloride. The extracts were dried over magnesium sulfate, filtered and evaporated. The residue was dissolved in 10 ml. toluene and 10 ml. glacial acetic acid. After stirring for 1½ hours at 60°, the solvents were evaporated under reduced pressure and the residue was distributed between methylene chloride and sodium carbonate solution. The methylene chloride layer was washed with water, dried and concentrated. The residue was slurried in ether and recrystallized from ethyl acetate to yield ethyl 7 - bromo-2,3-dihydro-2-oxo-5-(2-pyridyl)-1H-1,4-benzodiazepin-3-carboxylate with M.P. 224–225°.

2 drops of 2 N-sodium hydroxide were added to a solution of 10 mg. ethyl 7-bromo-2,3-dihydro - 2 - oxo-5-(2-pyridyl)-1H-1,4- benzodiazepin - 3 - carboxylate in 1 ml. ethanol. The solution was warmed for 2 minutes to 80°, buffered by addition of acetic acid and extracted with methylene chloride. The organic layer was separated, dried, filtered and evaporated. Crystallization of the residue from ether yielded 7-bromo-1,3-dihydro-5-(2-pyridyl)-2H-1,4-benzodiazepin-2-one with M.P. 254–255°.

EXAMPLE 23

0.8 g. sodium methoxide were added to a solution of 2.7 g. ethyl 3 - amino - 6 - chloro-4-hydroxy-4-(o-fluorophenyl) - 2-oxo-1,2,3,4-tetrahydroquinoline-3-carboxylate in 15 ml. dimethylformamide cooled to −20°. Having stirred for ½ hour at −20°, the temperature was lowered to −40° and 1.5 g. diethylaminoethyl chloride were added. Stirring was continued for 1 hour at −40° and for 1 hour at room temperature. The reaction mixture was poured on ice water and extracted with methylene chloride. The organic layer was dried over magnesium sulfate, filtered and evaporated. The residue was dissolved in benzene and the solution was extracted twice with 1 N hydrochloric acid. The acid extracts were made alkaline by addition of sodium carbonate and extracted with methylene chloride. The methylene chloride layer was dried, filtered and concentrated to leave an oil of ethyl 3-amino-6-chloro-1-(2-diethylaminoethyl)-4-hydroxy - 4 - (o-fluorophenyl)-2-oxo-1,2,3,4-tetrahydroquinoline - 3 - carboxylate which was purified by chromatography on 20 g. silica gel using methylene chloride/ethyl acetate followed by acetone for elution.

EXAMPLE 24

A mixture of 1 g. of ethyl 1-(2-diethylaminoethyl)-3-amino-1,2,3,4-tetrahydro - 4 - hydroxy-6-chloro-2-oxo-4-(o-fluorophenyl) - 3 - quinolinecarboxylate in 3.5 ml. of toluene and 3.5 ml. of acetic acid was heated at 70° for 4 hours. The reaction mixture was evaporated in a rotavapor, the residue was made alkaline with about 20 ml. of 10% sodium carbonate solution and extracted with methylene chloride. The organic layer was dried over magnesium sulfate, filtered, evaporated and purified on a column of silicagel (100 g. silicagel, eluant:acetone) yielding ethyl 7-chloro - 1,3 - dihydro-1-(2-diethylaminoethyl)-5-(o-fluorophenyl)-2-oxo-2H-1,4 - benzodiazepine-3-carboxylate.

IR:

—CO—ester: 1769 cm.$^{-1}$
—CO—amide: 1685 cm.$^{-1}$
MS: 459 molecular mass
NMR: singlet for proton in position 3 at 4.5 p.p.m.

EXAMPLE 25

1 ml. of 5-N hydrochloric acid in ether was added slowly to 15 ml. of pyridine. In this mixture was dissolved slowly 1 g. of ethyl 3-amino-1,2,3,4-tetrahydro-4-hydroxy-6-chloro - 2 - oxo - 4 - (o-fluorophenyl)-3-quinolinecarboxylate. The reaction mixture was heated to 100° for 1 hour and evaporated. The residue was dissolved in methylene chloride and washed with water to which some drops of 2-N hydrochloric acid have been added. The organic layer was dried over magnesium sulfate, filtered and evaporated. Crystallisation from ether yielded ethyl 5-(o-fluorophenyl) - 2,3 - dihydro-2-oxo-7-chloro-1H-1,4-benzodiazepine-3-carboxylate of M.P. 193–194°.

What is claimed is:

1. A process for the preparation of a benzodiazepine derivative of the formula

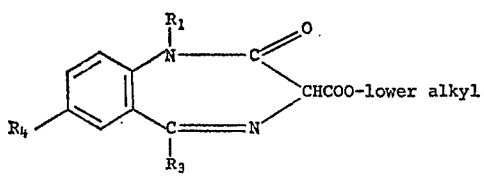

wherein $R_1$ is hydrogen, lower alkyl or di-lower alkyl-amino-lower alkyl; $R_3$ is phenyl, mono-halophenyl or pyridyl; and $R_4$ is hydrogen, halogen or nitro which comprises treating a compound of the formula

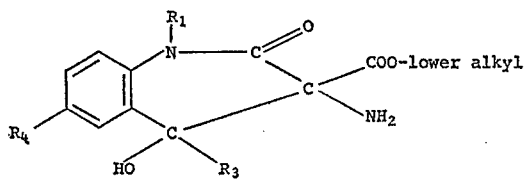

wherein $R_1$, $R_3$ and $R_4$ are as described above with an acid at a temperature of from room temperature to the reflux temperature of the reaction mixture.

2. The process of claim 1 wherein the acid utilized is acetic acid.

3. A process for the preparation of a benzodiazepine derivative of the formula

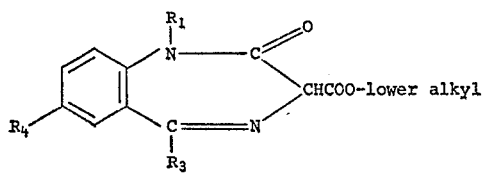

wherein $R_1$ is hydrogen, lower alkyl or di-lower alkyl-amino-lower alkyl; $R_3$ is phenyl, mono-halophenyl or pyridyl; and $R_4$ is hydrogen, halogen or nitro which comprises effecting ring expansion of a compound of the formula

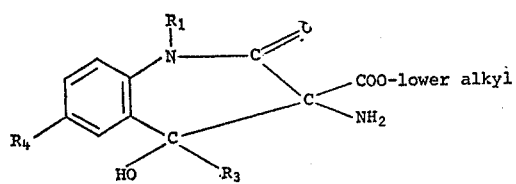

wherein $R_1$, $R_3$ and $R_4$ are as described above by thermal treatment thereof in the absence of an acid.

4. The process of claim 3 wherein the reaction is conducted in the presence of an inert organic solvent.

5. The process of claim 3 wherein the reaction is conducted within a temperature range of from about 100° to about 200° C.

6. A process for the preparation of a benzodiazepine derivative of the formula

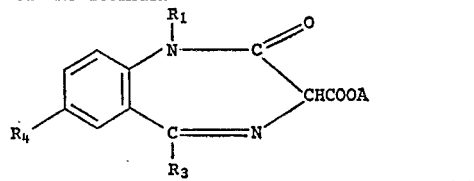

wherein $R_1$ is hydrogen, lower alkyl or di-lower alkyl-amino-lower alkyl; $R_3$ is phenyl, mono-halophenyl or pyridyl; and $R_4$ is hydrogen, halogen or nitro and A is the cation of a base which comprises effecting ring expansion of a compound of the formula

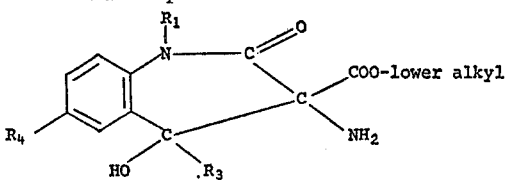

wherein $R_1$, $R_3$ and $R_4$ are as described above by acid treatment thereof at a temperature of from room temperature to the reflux temperature of the reaction mixture or thermal treatment thereof in the absence of acid to obtain a compound of the formula

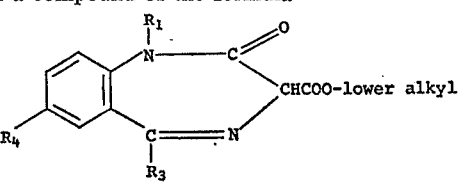

wherein $R_1$, $R_3$ and $R_4$ are as described above and then saponifying the so obtained compound of Formula III by base treatment thereof to obtain the compound of Formula I.

7. A process for the preparation of a benzodiazepine derivative of the formula

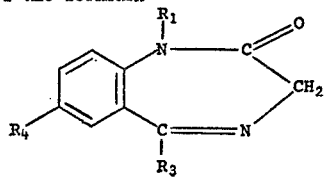

wherein $R_1$ is hydrogen, lower alkyl or di-lower alkyl-amino-lower alkyl; $R_3$ is phenyl, mono-halophenyl or pyridyl; and $R_4$ is hydrogen, halogen or nitro which comprises: (a) effecting ring expansion of a compound of the formula

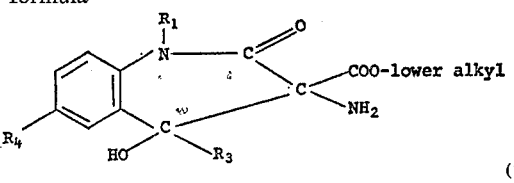

wherein $R_1$, $R_3$ and $R_4$ are as described above by acid treatment thereof at a temperature of from room temperature to the reflux temperature of the reaction mixture or thermal treatment thereof in the absence of an acid to obtain a compound of the formula

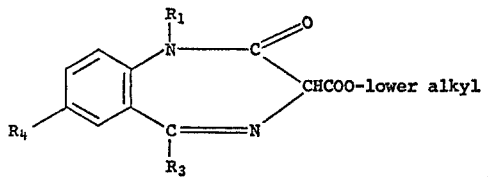

wherein $R_1$, $R_3$ and $R_4$ are as described above; (b) saponifying the so-obtained compound of Formula III above by base treatment thereof to obtain a compound of the formula

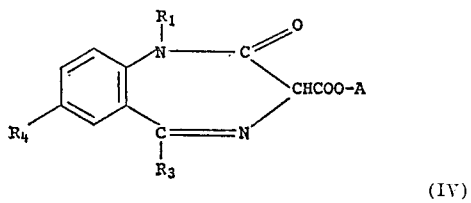

wherein $R_1$, $R_3$ and $R_4$ are as described above and A is the cation of a base; (c) and then decarboxylating the so-obtained compound of Formula IV above by acid treatment thereof to obtain the compound of Formula I.

8. The process of claim 7 wherein 7-nitro-5-phenyl-1,3-dihydro - 1 - methyl-5-phenyl-2H-1,4-benzodiazepin-2-one is prepared.

9. The process of claim 7 wherein 7-chloro-1,3-dihydro-1-methyl-5-phenyl-2H-1,4-benzodiazepin-2-one is prepared.

10. The process of claim 7 wherein 7-chloro-1,3-dihydro - 1 - diethylaminoethyl - 5 - (2-fluorophenyl)-H-1,4-benzodiazepin-2-one is prepared.

References Cited

UNITED STATES PATENTS 3,371,085  2/1968  Reeder et al. _____ 260—239.3

OTHER REFERENCES

Noller: "Chemistry of Organic Compounds," 2nd edition (1956) (Saunders), p. 246.

HENRY R. JILES, Primary Examiner

R. T. BOND, Assistant Examiner

U.S. Cl. X.R.

424—244; 260—287 R, 562 K, 482 P

UNITED STATES PATENT OFFICE
CERTIFICATE OF CORRECTION

Patent No. 3,657,223　　　　　　　　Dated April 18, 1972

Inventor(s) Hellerbach, Szente and Walser

It is certified that error appears in the above-identified patent and that said Letters Patent are hereby corrected as shown below:

Column 16, line 4 fluorophenyl)-H-1　　　should be fluorophenyl)-2H-1

Signed and sealed this 27th day of March 1973.

(SEAL)
Attest:

EDWARD M. FLETCHER, JR.　　　　ROBERT GOTTSCHALK
Attesting Officer　　　　　　　　Commissioner of Patents